United States Patent

Ginzboorg

[11] Patent Number: 5,878,125
[45] Date of Patent: Mar. 2, 1999

[54] METHOD FOR STORING ANALYSIS DATA IN A TELEPHONE EXCHANGE

[75] Inventor: Philip Ginzboorg, Helsinki, Finland

[73] Assignee: Nokia Telecommunications OY, Espoo, Finland

[21] Appl. No.: 765,333

[22] PCT Filed: Jun. 21, 1995

[86] PCT No.: PCT/FI95/00361

§ 371 Date: Dec. 23, 1996

§ 102(e) Date: Dec. 23, 1996

[87] PCT Pub. No.: WO96/00480

PCT Pub. Date: Jan. 4, 1996

[30] Foreign Application Priority Data

Jun. 23, 1994 [FI] Finland .................................. 943060

[51] Int. Cl.$^6$ .............................. H04M 3/42; H04M 7/00
[52] U.S. Cl. ........................................... 379/207; 379/220
[58] Field of Search .................................... 379/207, 219, 379/201, 220, 221, 225, 224, 230, 269; 370/110.1, 94.1, 60.1

[56] References Cited

U.S. PATENT DOCUMENTS 4,442,321  4/1984  Stehman .................................. 379/207
5,375,167  12/1994  Bales et al. .

FOREIGN PATENT DOCUMENTS

550 178   7/1993   European Pat. Off. .

*Primary Examiner*—Jack Chiang
*Attorney, Agent, or Firm*—Pillsbury Madison & Sutro LLP

[57] ABSTRACT

The invention relates to a method for storing analysis data, especially digit analysis data in a telephone exchange (21). The data is stored as a tree-like hierarchical data structure that returns the desired result on the basis of given initial data, said data structure comprising records (11; 31; A . . . F) located in several different levels, each record comprising a predetermined number of fields (0 . . . 9, a . . . f), the uppermost level composing the root level of the structure and a single field of a record either being empty or comprising a pointer that points to the destination that may be either a record or a result in a lower level. For enabling new services of a telephone network, such as free numbering, without a continuously increasing need for memory capacity or purchases of devices, stored data is compressed by searching in a single level of the structure all the records the corresponding fields of which are pointing to the same destination, by deleting all except one of the found records and by changing the pointers of upper levels that have pointed to the deleted records so that they point to said one record, whereby said measures are started from the lowest level of the structure, after which they are repeated in the following level if necessary, until the root level is reached.

8 Claims, 8 Drawing Sheets

LOCAL EXCHANGE 22         LOCAL EXCHANGE 23

METHOD FOR STORING ANALYSIS DATA IN A TELEPHONE EXCHANGE

This application is the national phase of international application PCT/FI95/00361 filed Jun. 21, 1995 which designated the U.S.

BACKGROUND OF THE INVENTION

The invention relates to a method in accordance with the preamble of the attached claim 1 for storing analysis data in a telephone exchange. The method of the invention is intended especially for storing data structures used in the digit analyses of telephone exchanges, but as the following more detailed description will show, the same principle may also be utilized for storing in a telephone exchange data which is intended for carrying out other analyses.

When a subscriber of a telephone network makes a call, the destination (subscriber B) of the call is determined on the basis of the dialled digit combination (i.e. telephone number). Each node of the telephone network finds out the destination of incoming calls by analysing these digits. This procedure, in the following referred to as digit analysis, is a functional part of a telephone exchange, which, in response to a given telephone number, returns the corresponding destination.

Digit analysis is based in a telephone exchange (e.g. in a DX 200 of the applicant) on a data structure in which records form a hierarchical tree structure. Each record contains e.g. 16 fields, each corresponding to a certain button of the telephone (0, 1, 2, . . . 9, *, #, etc.). A single field is either empty (i.e. it is not in use and thus contains nothing), or it contains a pointer. The pointer (which in practice is some binary digit) may point either to the following record or to a destination that is the result of the digit analysis. An empty field means in practice that no digit analysis is carried out for the corresponding button of the telephone.

Figure 1:
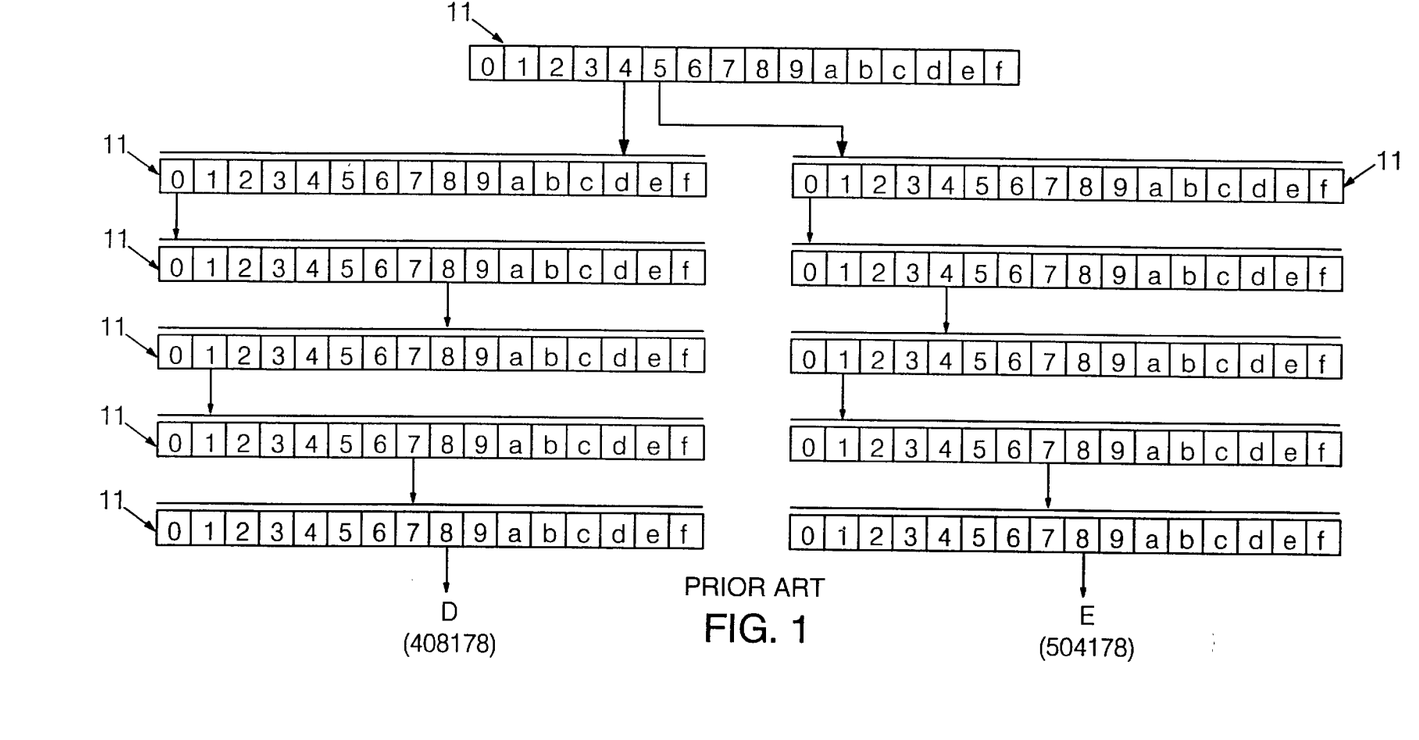
FIG. 1 shows the data structure to be used for digit analyses in a telephone exchange when a conventional hierarchical numbering is employed.

FIG. 1 illustrates the principle described above. A data structure is composed of several records 11, each containing 16 fields, which are marked with reference symbols 0 . . . 9, a, . . . f. For instance, an analysis carried out for telephone number 408178 returns destination D and an analysis carried out for telephone number 504178 returns destination E. The analysis is carried out by proceeding in the tree structure one dialled digit at a time and examining the content of the field corresponding to the dialled digit, and by proceeding to the record pointed to by the pointer included in said field, in which record the content of the field corresponding to the following digit is examined etc. The field corresponding to the digit to be examined last provides the result of the analysis (destination).

A problem in the present situation is that the size of the data structure to be used for digit analyses tends to grow very large and demands plenty of memory capacity in the exchange. Reasons for this are e.g. the growth of the capacity of the telephone exchanges, new services offered by the telephone exchanges, particularly the willingness of the telephone operators to employ free (i.e. non-hierarchical) numbering.

Figure 2:
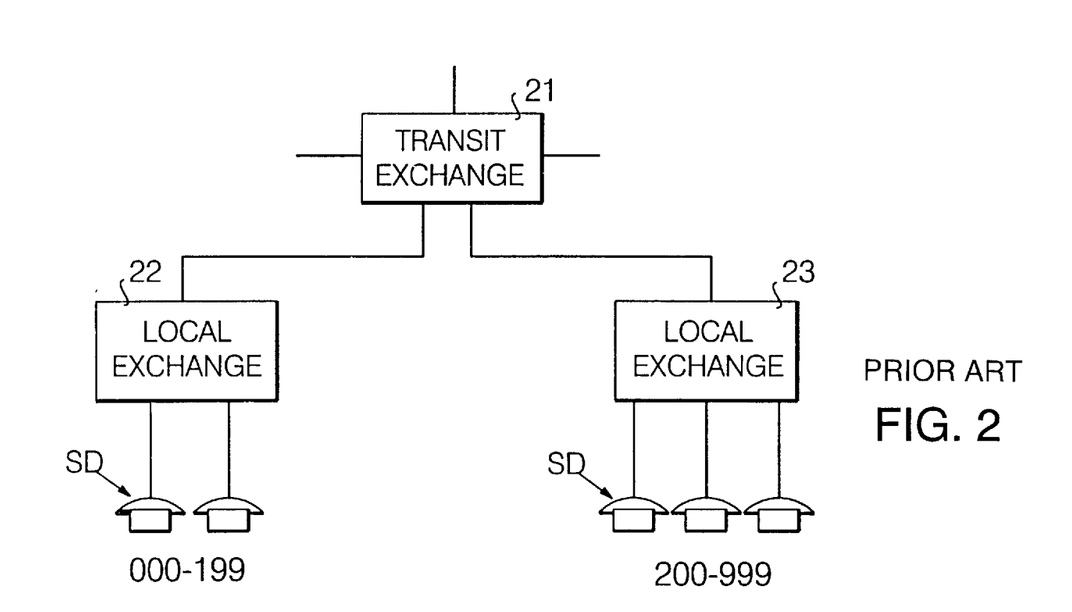
FIG. 2 shows the area of one transit exchange when hierarchical numbering is employed.
Figure 3:
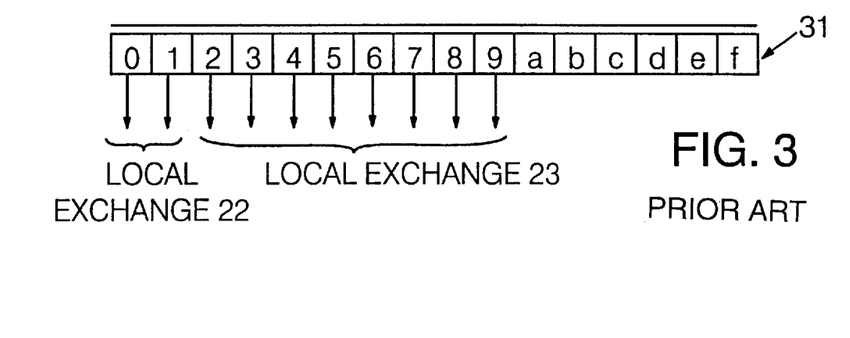
FIG. 3 shows the data structure to be used for digit analyses in the transit exchange of FIG. 2.
Figures 4, 5:
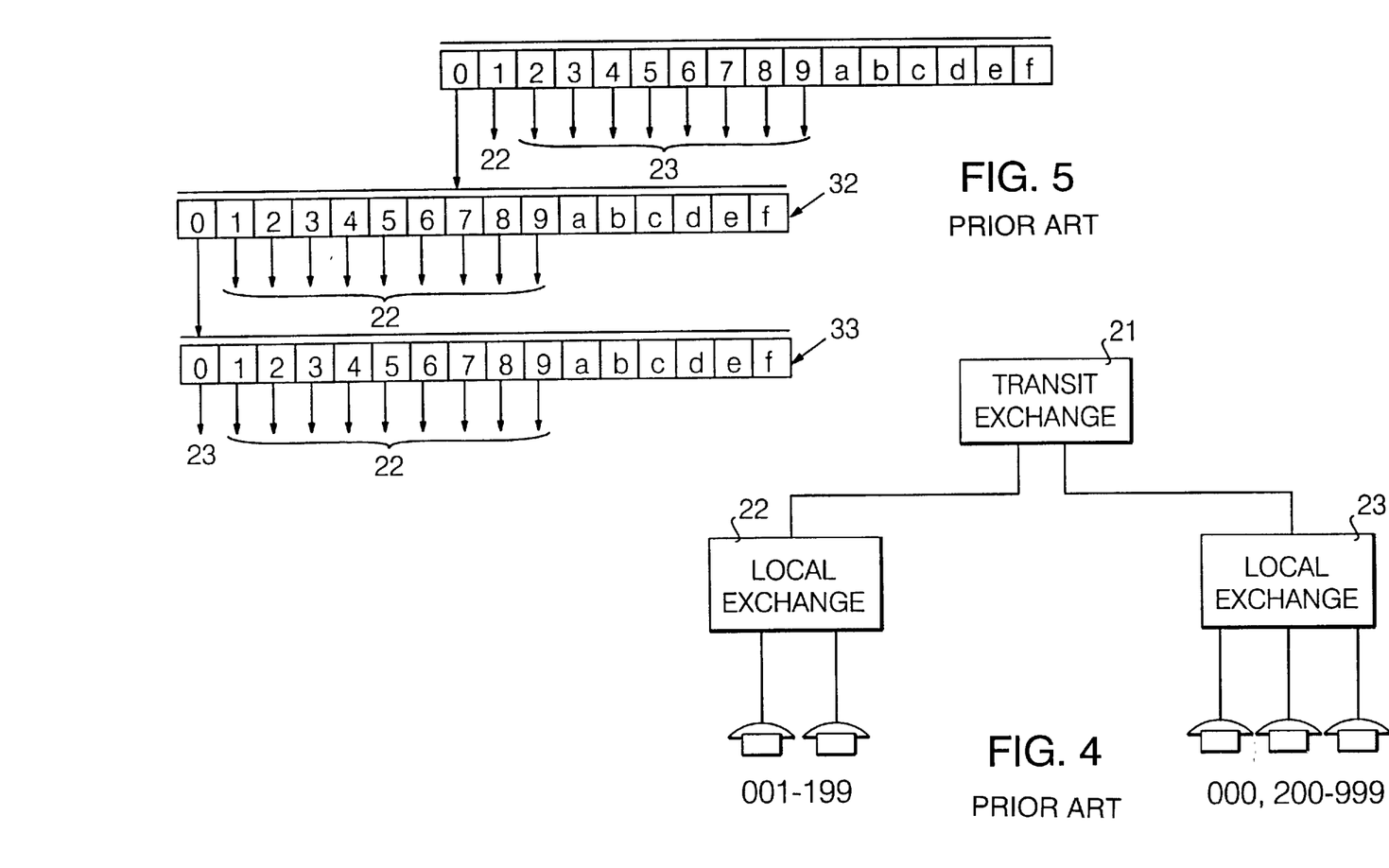
FIG. 4 shows the case of FIG. 2 when an exception is made to conventional, hierarchical numbering.
FIG. 5 shows the data structure to be used for digit analyses in the transit exchange of FIG. 4.

In prior art, a hierarchical structure has been used in numbering, whereby in each node of the telephone network the destination may be determined by using only a part of the whole telephone number. This prior art way of numbering and the problem arising from free numbering are illustrated in FIGS. 2 . . . 4. FIG. 2 shows a transit exchange 21, which is connected via interconnecting lines to local exchanges 22 and 23, to which subscriber devices SD are connected via subscriber lines. This example contains a total number of 1000 subscriber lines. Let us assume that the telephone numbers of the subscribers located within the area of the transit exchange 21 are in the range 0. . . 999 and that the subscribers whose telephone numbers are within the range 000 . . . 199 are connected to local exchange 22, and the subscribers whose telephone numbers are within the range 200 . . . 999 are connected to local exchange 23. Thus, the data structure to be used for digit analyses in the transit exchange 21 is similar to that shown in FIG. 3, comprising one record 31, the first two fields of which point to local exchange 22, fields 2 . . . 9 point to local exchange 23 and fields a . . . f are empty. In this case, the data structure is thus very simple; in order that a call could be routed in the transit exchange correctly, only the first digit of the telephone number must be analyzed there.

Let us now assume that a subscriber whose telephone number is 000 moves from the area of local exchange 22 to the area of local exchange 23, and his telephone number remains the same. Thus, the situation is similar to that shown in FIG. 4, i.e. subscribers having telephone numbers 000 and 200 . . . 999 are located in the area of local exchange 23. The tree-like data structure of the transit exchange grows in this case a new branch (records 32 and 33), as shown in FIG. 5. If some other subscriber moves from the area of one local exchange to another and his telephone number remains the same, another new branch will grow to the tree. If the subscriber numbers are randomly distributed between the local exchanges, each digit of the telephone number must be analyzed separately. In that case, a data structure contains (in the case of this example) 111 records, i.e. 111 times as many as in the hierarchical case corresponding to FIGS. 2 and 3.

As appears from the above, changing over to free (non-hierarchical) numbering causes a strong expansion of the data structures to be used for digit analyses, and accordingly, a significantly greater demand for memory than before in the node (exchange) of the network. An attempt could be made for solving the problem in a straightforward way by increasing the memory, but in the long run, however, this is not a practical solution.

Another possible solution would be to build a centralized database (e.g. one similar to HLR (Home Location Register) of the GSM mobile communication network), to which the nodes of the network send queries via a high speed signalling link. However, a centralized data base of this kind requires lots of modifications to the network, and is thus a costly solution. Due to this, it is not a suitable solution e.g. for telephone companies, which wish to offer new services, such as free numbering without making any large purchases of devices. Introducing a centralized database does not eliminate the actual problem either, but only shifts it to another (centralized) place, where it is more easily handled.

BRIEF DESCRIPTION OF THE INVENTION

The object of the present invention is to eliminate the problems described above and provide a solution with the aid of which e.g. free numbering may be offered without a continuous need for increasing memory or for other purchases of devices. This object is achieved with a method of the invention, which is characterized in what is described in the characterizing part of claim 1.

The idea of the invention is to compress the data structure used for the analyses in the node (telephone exchange) of a telephone network by combining identical records in each level of the structure into one record and by changing all pointers that have pointed to the deleted records from other levels of the structure so that they point to said one record.

Due to the solution of the invention, the required memory capacity may be essentially decreased, or, accordingly, essentially more data may be stored in the same memory capacity. The compression factor achieved depends on the ratio of the number (N) of the telephone numbers to be analyzed and the number (R) of the results (destinations) so that the larger the ratio N/R is, the better is the compression factor. Thus, when the number of telephone numbers noticeably exceeds the number of destinations (which is a normal case), a very good compression result is achieved with the invention.

In the following, the invention and its preferred embodiments will be described in greater detail with reference to the examples in accordance with FIGS. 6–11 in the attached drawings, in which

DETAILED DESCRIPTION OF THE INVENTION

Figure 6:
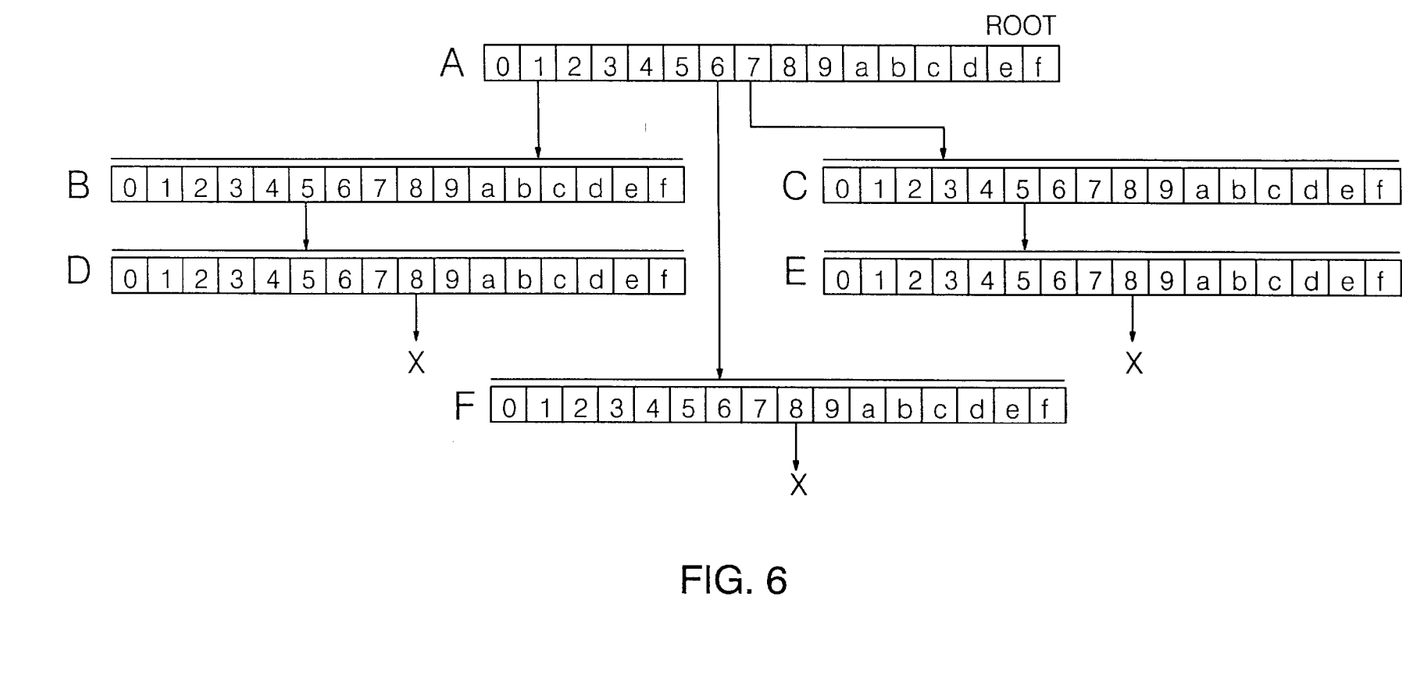
FIG. 6 shows one non-compressed data structure of a telephone exchange.

In the method of the invention, the tree-like data structure used for digit analyses is first divided into layers. Each layer is composed of a group of those records the maximum distance of which from the result of the digit analysis is the same. If the maximum length of all analyses stored in the data structure is n, the tree will have n layers. Each layer contains one or more records. FIG. 6 illustrates formation of the layers. Records D, E and F are located in layer zero (0) (since their fields point only to the result X of the analysis), records B and C are in layer one and record A is located in layer two (the root of the tree is always located in the last layer).

Figure 7:
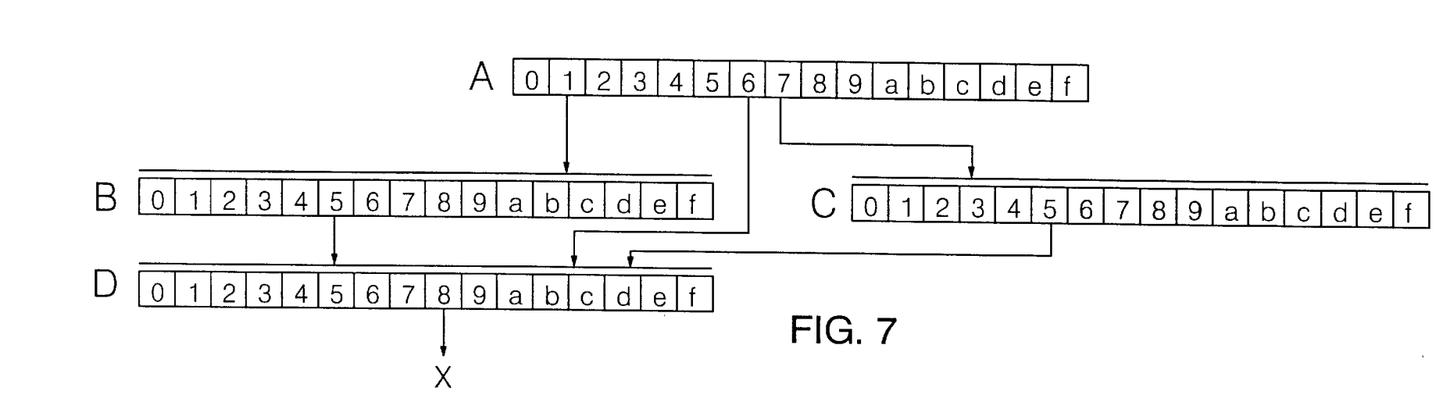
FIG. 7 shows the data structure of FIG. 6 partly compressed.

The data structure is compressed in accordance with the invention as follows. The start takes place in the last layer (or layer zero). If more than one records of said layer are identical, in other words, if they provide the same result for each single digit of a telephone number (i.e. the corresponding button), they will be merged into one record. In the merging process, one remaining record is selected from the records to be merged, other records are deleted, and all pointers from the following (upper) layers (layer one, layer two, etc.) that have pointed to the deleted records are changed so that they point to the remaining record. In the case of the example in FIG. 6, the measures described above mean that records D, E and F (which have been found identical, since equivalent fields provide the same result) of layer zero are merged, whereby one remaining record, e.g. record D is selected first. Records E and F are deleted, and the pointers that have pointed to them (i.e. the pointer of field 5 of record C and the pointer of field 6 of record A) are changed so that they point to record D. After this, the situation is similar to one shown in FIG. 7.

Figure 8:
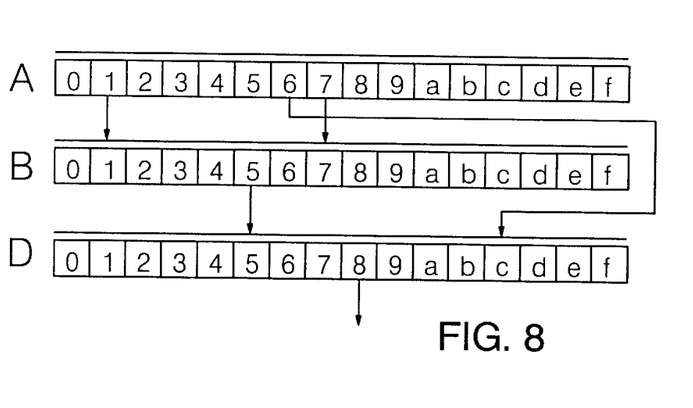
FIG. 8 shows the data structure of FIG. 6 completely compressed.

When all possible merges are completed in the lowest layer, one may proceed to the following layer and carry out the corresponding measures. After this, it is again proceeded to the following layer. This is continued until the root of the tree is reached. At this stage the data structure is compressed. In the case of the example in FIGS. 6 and 7, one thus proceeds after layer zero to layer one, in which records B and C are found identical. Record B is selected as the remaining record, so record C is deleted and the pointers that have pointed to it from the upper layers (i.e. the pointer of field 7 of record A) are changed so that they point to record B. Since there are no other records to be merged, one may proceed to the following layer, which is the root of the structure, and the compression is thus completed. The result achieved in this way is shown in FIG. 8. The number of the records has decreased to a half of the original number.

If one acts in the way described above, the data structure used for digit analyses is transformed into a Directed Acyclic Graph (DAG). (A graph, which is a concept used in network theory, consists of a set of nodes and a set of edges that connect the nodes. For example, the nodes can be represented as records and the edges represented as pointers. A graph is directed if its edges are organized pairs of nodes. A graph is acyclic if there is no sequence of edges that forms a loop.)

In the procedure described above, equivalent records may be searched in a variety of ways. The most straightforward way is to compare records with each other in pairs (field by field). A more advanced and a faster (but more complicated to implement) way, however, is to sort the records lexicographically: first of all, selecting all the records providing the same result for the first digit, then selecting from those records the ones providing the same result for the second digit, etc. This is continued until one reaches the last digit. The remaining records are identical and they may be merged.

Figure 8B:
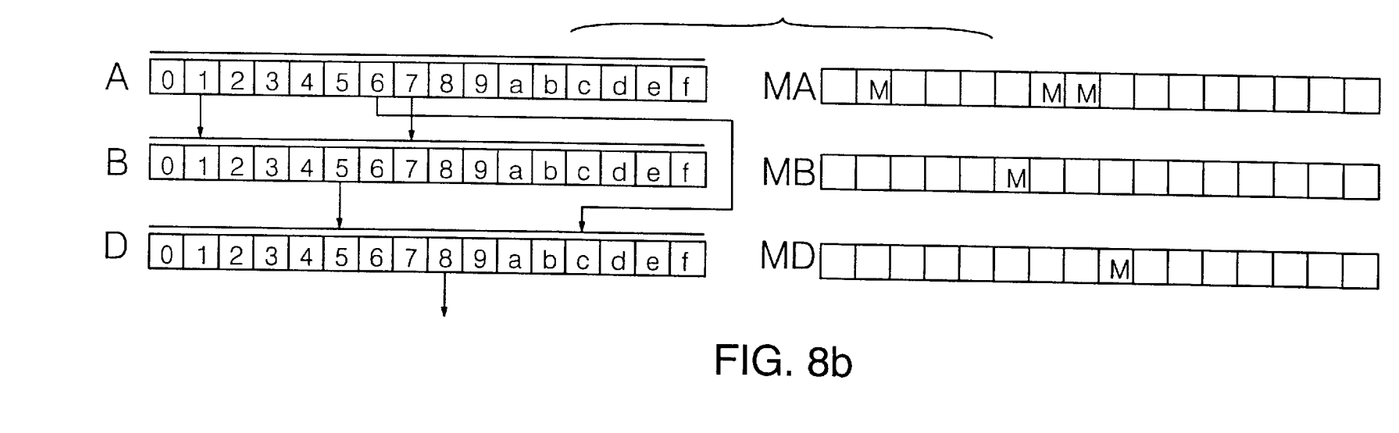
FIG. 8b illustrates the use of bit masks associated with the method of the invention.

In the merging process, the records located in the following layers must be checked, references to the deleted records must be searched and they must be replaced with new references to the remaining record. This operation may be accelerated if each record has a bit mask the size of which corresponds to the number of possible digits. For example, in the example described above, a record contains 16 fields (16 possible buttons), the size of the bit mask being 16 bits. In the bit mask, bit 1 in position i, for instance, will thus indicate that there is a result of the analysis for the digit corresponding to position i. Bit 0 in position i will thus indicate that there is no result of the analysis for the digit corresponding to position i (i.e. the corresponding field contains no pointer). By means of a bit mask, the operations may thus be directed to existing analyses only, and other operations may be ignored, which ensures a maximum speed of the operations. A bit mask is illustrated in FIG. 8b, in which all the records shown in FIG. 8 have a corresponding bit mask MA, MB and MD respectively, in which the mask bit indicating the existence of an analysis result is marked with a reference symbol M, and other bit positions are left empty.

Figure 9:
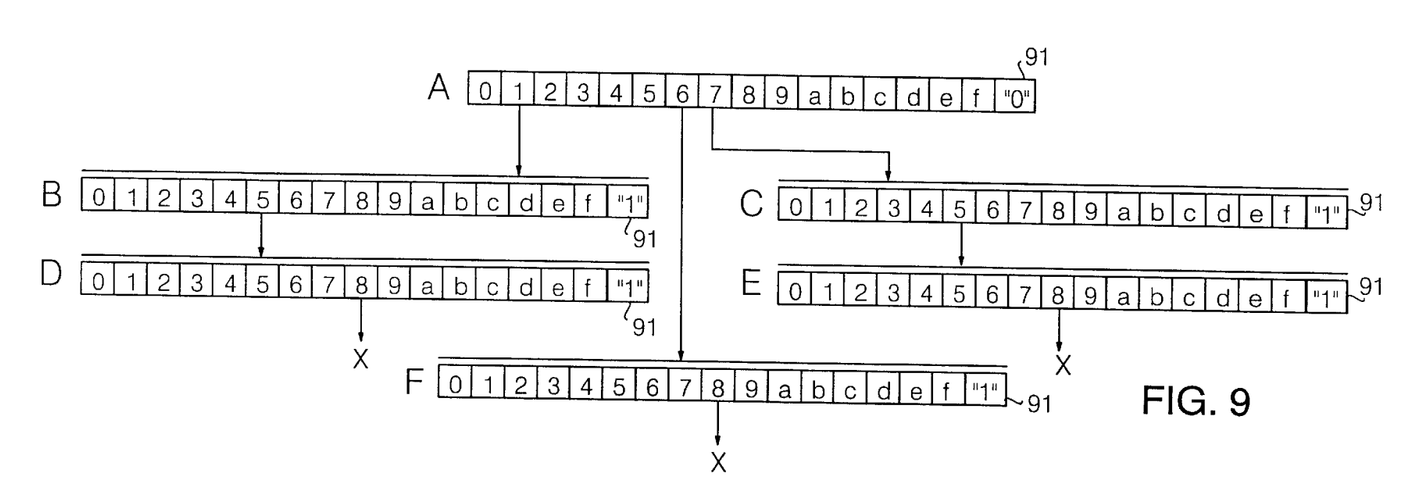
FIG. 9 illustrates records provided with an additional field in a conventional case.
Figure 10:
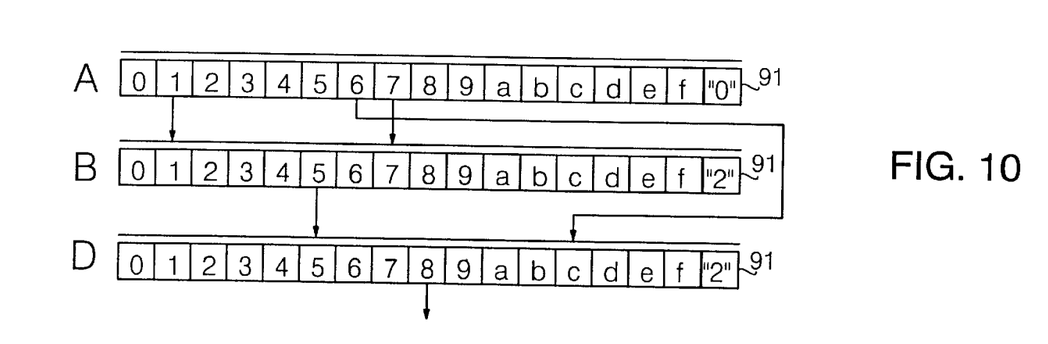
FIG. 10 illustrates records equipped with an additional field in a case in accordance with the invention.

The compression and the maintenance of data structure described above are facilitated if one knows for each record the number of records pointing to it (let us call these records "parents"). In a preferred embodiment of the invention, an additional field reporting the number of "parents" of each record is attached to each record. The value of this field is kept updated by means of a counter provided for this purpose. The counter is thus decremented or incremented each time when a corresponding alteration is made to the data structure. Let us define that a digit analysis corresponding to one string of digits (telephone number) forms one "branch" of the tree. In a conventional tree, each record, except for the root record, has one and only one parent, so the additional field of the root record has the value 0 and the additional fields of all other records have the value 1. This is illustrated in FIG. 9, in which the additional field is marked with reference number 91. When the way of compression in accordance with the present invention is employed, several "branches" may be merged, whereby the value of the counter for additional fields is equal to the number of the "branches" to be merged. This is illustrated in FIG. 10 that corresponds to the example in FIG. 8. The additional fields B and D of the records now have the value two.

Figure 11:
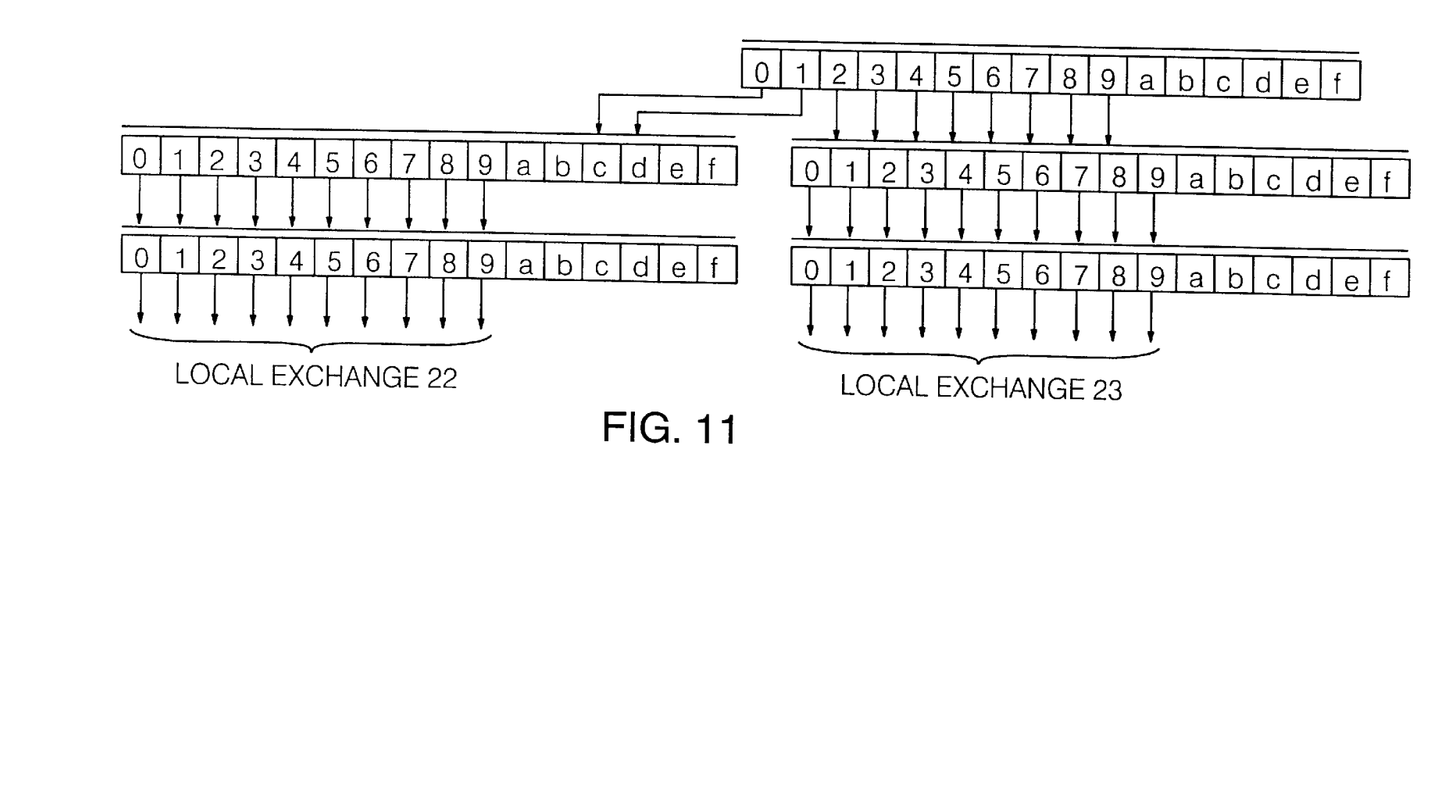
FIG. 11 shows redundant data files that are removed by means of an additional compression phase in accordance with a preferred embodiment of the invention.

In accordance with a preferred embodiment of the invention, an additional compression may also be carried out by means of which redundant records are removed. To illustrate this additional embodiment, let us return to the example shown in connection with FIGS. 2 and 3. Let us assume that initially the telephone numbers were randomly distributed between local exchanges 22 and 23, but, after a few years, subscribers having moved to the areas of other local exchanges without changing their telephone numbers, the telephone numbers are divided into two consecutive groups: the numbers 000 . . . 199 are connected to local exchange 22 and the numbers 200 . . . 999 to local exchange 23. When a compression has been carried out in the transit exchange to the data structure used for digit analyses in the way described above, it will be similar to one shown in FIG. 11. It is thus found that all other records except the record located at the root are redundant. (A record is redundant if it is the last record of an analysis branch, but it is not the first record of an analysis branch and if all its fields (in use) point to the same result (destination).) Redundant records are removed by adding a postcompression loop after the actual compression as follows: if all the fields of the record located in layer zero point to the same result, the record is deleted and all the fields that have pointed to it in the records in upper layers are changed so that they point to said result. As a result of this operation, some of the "parents" (records that have pointed to the deleted record) may become redundant. The operation should therefore be continued until there are no redundant records left.

In accordance with the invention, two analysis branches may be merged only if they lead to the same result. The attainable compression factor depends on the ratio of the number N of the telephone numbers to be analyzed and the number R of the results. The greater the ratio N/R, the better is the compression result. Since in practice the number of the telephone numbers N is usually noticeably greater than the number of the results R, a good compression result is usually achieved with the method. The attainable compression factor may be in practice more than 100.

The attached appendix shows by way of pseudocode examples insertion of a new branch to a tree and removal of an old branch from a tree. Both cases show an example of a conventional tree structure and an example of the structure compressed in accordance with the invention. As appears from the appendix, programmes intended for maintaining data compressed in accordance with the invention do not change much from the programmes that are used for maintaining known data structures (tree structures). This is an additional advantage of the method of the invention. It may also be noted that the programmes reading the data structure do not change at all.

When a new analysis branch is inserted to a data structure compressed in accordance with the invention, the situation may change so that the size of the data structure is no longer minimized. It is therefore advantageous to carry out the compression in accordance with the invention at certain intervals. Compression may thus be carried out automatically, for example, always when the number of the records allocated (taken into use) has increased by a certain number, e.g. a hundred after the latest compression.

Although the invention has been described above with reference to the accompanying drawings, it is obvious that the invention is not limited thereto, but it may be modified within the scope of the inventive idea described above and in the attached claims. The principle of the invention may also be used for storing data intended for carrying out other analyses in a telephone exchange (or a corresponding place in which analyses of this kind are carried out) or for compressing a similar data structure in a telephone exchange.

A. Definitions:

"new" is a function that allocates a new record, initializes it and provides the record an identifier, "delete" is a procedure that deletes a record (so that the record is shifted to the pool of free records), $d_0 d_1 d_2 \ldots D_n EOS$ is a string of digits formed by a telephone number. EOS is the end of string mark.

a-result is the result of the analysis. Prior to making a modification it must be made sure whether it is allowable, i.e. that the analysis exists prior to deletion, and that the analysis does not exist prior to insertion.

B. Inserting:

Inserting a new branch to a tree is carried out as follows:

```
i:=0;r:=root;
if d_0:=EOS then exit end if;
while d_{i+1}≠EOS
do
    if r(d_i)=empty then r(d_i):=new end if;
    r:=r(d_i);i:=i+1;
end do;
r(d_i):=a-result;
```

Inserting a new branch to a structure compressed in accordance with the invention is carried out as follows:

```
i:=0; r:=root; parent:=root;
if d_0:=EOS then exit end if;
while d_{i+1}=EOS
do
    if r.parents counter>1 then
    r.parents counter:=r.parents counter−1;
    r:=new; parent(d_{i−1}) :=r;
    end if;
if r(d_i)=empty then r(d_i):=new end if;
r:=r(d_i);i:=i+1;
```

```
end do;
r(d_i) :=a–result;
C. Deleting:
   Deleting a branch from a tree is carried out as follows:
i:=0; r:=root;
while d_i≠EOS
do
   next record:=r(d_i) ; r(d_i) :=empty;
   if for all possible digits d,r(d) :=empty
   then delete (r);
   end if;
   r:=next record; i:=i+1;
end do;
   Deleting a branch from a structure compressed in accordance with the invention is carried out as follows:
i:=0; r:=root;
while d_i=EOS
do
   next record:=r(d_i); r(d_i):=empty;
   if for all possible digits d,r(d):=empty
   then delete (r)
   end if;
   if next record.parents counter>1 then next record.parents
      counter next record parents counter−1;
   goto end of while;
   end if;
   r:=next record; i:=i+1;
end do;
end of while:
```

As appears from the above, only slight modifications are needed compared with previously known maintenance methods in the maintenance of a structure compressed in accordance with the invention.

I claim:

1. A method for storing analysis data, especially digit analysis data in a telephone-exchange (21), said data being stored as a tree-like hierarchical data structure that returns the desired result on the basis of given initial data, the data structure comprising records (11; 31; A . . . F) in several different levels, the records each comprising a predetermined number of fields (0 . . . 9, a . . . f), the uppermost layer composing a root level of the structure and a single field of a record either being empty or comprising a pointer pointing to a destination that may be either a record located in a lower level or the result, characterized by compressing the stored data by searching in a single level of the structure all the records the fields of which corresponding to each other point to the same destination, by deleting all except one of the found records and by changing the pointers of upper levels that have pointed to the deleted records so that they point to said one record, whereby said procedures are started from the lowest level of the structure, after which they are repeated if necessary in the following level until the root level is reached.

2. A method as claimed in claim 1, characterized in that the search of the records is carried out by comparing the records with each other in pairs.

3. A method as claimed in claim 1, characterized in that the search of the records is carried out by first searching the records pointing to the same destination from the first field (0), selecting from these the ones pointing to the same destination from the second field (1), etc. until the final pool of records is obtained after searching through all the fields (0 . . . 9, a . . . f).

4. A method as claimed in claim 1, characterized in that in every record, a bit mask (MA, MB, MD) is used, the length of which in bits corresponds to the maximum number of the fields in a record, and a single bit of which indicates whether the corresponding field of the record is empty or whether it comprises a pointer.

5. A method as claimed in claim 1, characterized in that each record comprises an additional field (91) that indicates the number of the records pointing to said record.

6. A method as claimed in claim 1, characterized in that after the actual compression, additional compression is carried out in which such a record is searched in a single layer of the structure having all fields pointing to the same result, the found record is deleted, and all fields that have pointed to it in the records in upper layers of the structure are changed so that they point to said result.

7. A method as claimed in claim 1, characterized in that compression is repeated at certain intervals.

8. A method as claimed in claim 7, characterized in that compression is repeated always when the number of records that have been taken into use has increased by a certain predetermined value after the latest compression.

* * * * *